(12) United States Patent
Wu et al.

(10) Patent No.: US 10,598,977 B2
(45) Date of Patent: Mar. 24, 2020

(54) DISPLAY APPARATUS (71) Applicant: CHAMP VISION DISPLAY INC., Hsinchu County (TW)

(72) Inventors: Jhong-Hao Wu, Hsin-Chu (TW); Chin-Ku Liu, Hsin-Chu (TW); Fa-Chih Liu, Hsin-Chu (TW); Yi-Yu Tsai, Hsin-Chu (TW); Hsin-Hung Lee, Hsin-Chu (TW); Chiao-Chih Yang, Hsin-Chu (TW)

(73) Assignee: CHAMP VISION DISPLAY INC., Miaoli County (TW)

( * ) Notice: Subject to any disclaimer, the term of this patent is extended or adjusted under 35 U.S.C. 154(b) by 0 days.

(21) Appl. No.: 15/660,983

(22) Filed: Jul. 27, 2017

(65) Prior Publication Data
US 2018/0275449 A1 Sep. 27, 2018

(30) Foreign Application Priority Data

Mar. 21, 2017 (CN) .................... 2017 2 0275296 U (51) Int. Cl.
*G02F 1/1335* (2006.01)
*G02F 1/1333* (2006.01)
(Continued)

(52) U.S. Cl.
CPC ..... *G02F 1/133504* (2013.01); *G02B 5/0231* (2013.01); *G02B 5/045* (2013.01); *G02B 5/3025* (2013.01); *G02F 1/13336* (2013.01); *G02F 1/133308* (2013.01); *G02F 1/133509* (2013.01); *G02F 1/133512* (2013.01); *G02F 1/133524* (2013.01); *G02F 1/133526* (2013.01); *G02F 1/133528* (2013.01); *G02B 6/0053* (2013.01); *G02B 6/0078* (2013.01); *G02F 2001/133388* (2013.01); *G02F 2001/133538* (2013.01)

(58) Field of Classification Search
CPC ......... G02F 1/133504; G02F 1/133509; G02F 1/133528; G02F 2001/133388; G02F 2001/133538; G02F 1/133512; G02B 5/0231; G02B 5/045; G02B 5/3025
USPC ......... 359/487.01, 487.02, 613, 599; 349/96, 349/103, 112, 104, 110
See application file for complete search history.

(56) References Cited

U.S. PATENT DOCUMENTS 4,936,654 A * 6/1990 Suzaki ................ G02F 1/13363
349/101
5,034,864 A * 7/1991 Oe ...................... G09F 13/0409
362/224
(Continued)

FOREIGN PATENT DOCUMENTS

CN 1104795 7/1995
TW 1307421 3/2009
(Continued)

*Primary Examiner* — Ricky D Shafer
(74) *Attorney, Agent, or Firm* — JCIPRNET (57) ABSTRACT

A display apparatus including a display, a prism module and a filter layer is provided. The prism module is disposed on the display. The prism module includes a transparent substrate and a plurality of prism structures. The prism structures are located on the transparent substrate, and a plurality of tips of the prism structures is located away from the display. The filter layer is disposed between the prism module and the display, or the prism module is disposed between the filter layer and the display.

5 Claims, 9 Drawing Sheets (51) Int. Cl.
*G02B 5/02* (2006.01)
*G02B 5/30* (2006.01)
*G02B 5/04* (2006.01)
*F21V 8/00* (2006.01)

(56) References Cited

U.S. PATENT DOCUMENTS

| | | | |
|---|---|---|---|
| 5,828,488 A | 10/1998 | Ouderkirk et al. | |
| 6,847,428 B1* | 1/2005 | Sekiguchi | G02F 1/1334 349/139 |
| 7,889,289 B2* | 2/2011 | Misono | G02B 5/0231 349/61 |
| 8,023,194 B2* | 9/2011 | Kwon | G02F 1/133526 359/625 |
| 2002/0000772 A1* | 1/2002 | Kitahara | H01L 51/5262 313/503 |
| 2004/0218115 A1* | 11/2004 | Kawana | G02B 5/201 349/71 |
| 2007/0132778 A1 | 6/2007 | Gallen et al. | |
| 2009/0027591 A1* | 1/2009 | Hwang | G02B 5/0226 349/64 |
| 2010/0075069 A1* | 3/2010 | Laney | B32B 27/36 428/1.6 |
| 2010/0259829 A1* | 10/2010 | Kim | G02B 27/026 359/609 |
| 2011/0128477 A1* | 6/2011 | Izaki | G02B 5/3083 349/96 |
| 2011/0285934 A1* | 11/2011 | Watanabe | G02F 1/133526 349/58 |
| 2012/0139964 A1* | 6/2012 | Han | G02F 1/133526 345/690 |
| 2012/0206674 A1* | 8/2012 | Weber | G02B 5/305 349/84 |
| 2015/0369973 A1* | 12/2015 | Liu | G02B 5/045 359/831 |
| 2015/0370133 A1* | 12/2015 | Kim | G02F 1/133608 362/97.1 |
| 2017/0059765 A1* | 3/2017 | Oshima | G02B 6/0053 |

FOREIGN PATENT DOCUMENTS

| | | |
|---|---|---|
| TW | 201319685 | 5/2013 |
| TW | M520676 | 4/2016 |

\* cited by examiner

DISPLAY APPARATUS

CROSS-REFERENCE TO RELATED APPLICATION

This application claims the priority benefit of China application serial no. 201720275296.7, filed on Mar. 21, 2017. The entirety of the above-mentioned patent application is hereby incorporated by reference herein and made a part of this specification.

BACKGROUND OF THE INVENTION

Field of the Invention

The invention relates to a display apparatus, and particularly relates to a display apparatus having prism structures.

Description of Related Art

A large screen display system may meet the user's needs of displaying a variety of shared information in a large area. Presently, a method of implementing the large screen display system is to splice a plurality of display screens to achieve displaying a large image frame. For example, it is a common method to splice a plurality of liquid crystal displays (LCDs) to form the large screen display system. However, since a frame region of the LCD generally has circuits and mechanical members used for fixing internal components of the LCD, the frame region may not be used for displaying image and is referred to as an invalid display region of the LCD. When a plurality of the LCDs are spliced to form the large screen display system, since a plurality of image frames of the LCDs contain the invalid display regions, it causes discontinuity of the whole image frame, and influences the image quality.

In order to resolve the above problem, one solution is to correspondingly dispose a prism sheet above the invalid display region. Since an image beam sent by a display region located adjacent to the invalid display region in the LCD may be transmitted to the prism sheet, the prism sheet changes an optical path of the image beam for transmitting to the eyes of the user. Therefore, when the user views the invalid display region, the user may see the image frame, and is not liable to perceive the discontinuity of the whole image frame.

However, the above solution still has following disadvantages. When an environmental light irradiates the aforementioned prism sheet, the prism sheet may reflect the environmental light back to the user's eyes. Therefore, when the user views the image frame, a brightness of a portion of the image frame transmitted by the prism sheet is higher due to the environmental light, and the other portion of the image frame is relatively dark, which causes a poor contrast of the image frame, and meanwhile the user may perceive existence of the prism sheet. Moreover, when the user views the image frame, due to the refraction of the prism sheet, a location of the image frame located at an edge of the LCD is misaligned with the image frame of the LCD located adjacent to the edge. Moreover, when the user views the image frame, the user may perceive that the brightness of the image frame corresponding to the location of the prism sheet is greatly decreased. The above image frame misalignment and brightness inconsistency may cause visual discomfort of the user.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention were acknowledged by a person of ordinary skill in the art.

SUMMARY OF THE INVENTION

The invention is directed to a display apparatus, which is able to achieve a borderless display effect and has good display quality.

Other objects and advantages of the invention may be further illustrated by the technical features broadly embodied and described as follows.

In order to achieve one or a portion of or all of the objects or other objects, an embodiment of the invention provides a display apparatus including a display, a prism module and a filter layer. The prism module is disposed on the display. The prism module includes a transparent substrate and a plurality of prism structures. The prism structures are located on the transparent substrate, and a plurality of tips of the prism structures is located away from the display. The filter layer is disposed between the prism module and the display, or the prism module is disposed between the filter layer and the display.

According to the above description, the display apparatus of the invention has at least one of the following advantages. Through the configuration of the filter layer, the display apparatus may decrease the influence of the environmental beam on the prism module, such that besides the display apparatus achieves the borderless display effect, the display apparatus may also present image frames with good contrast.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
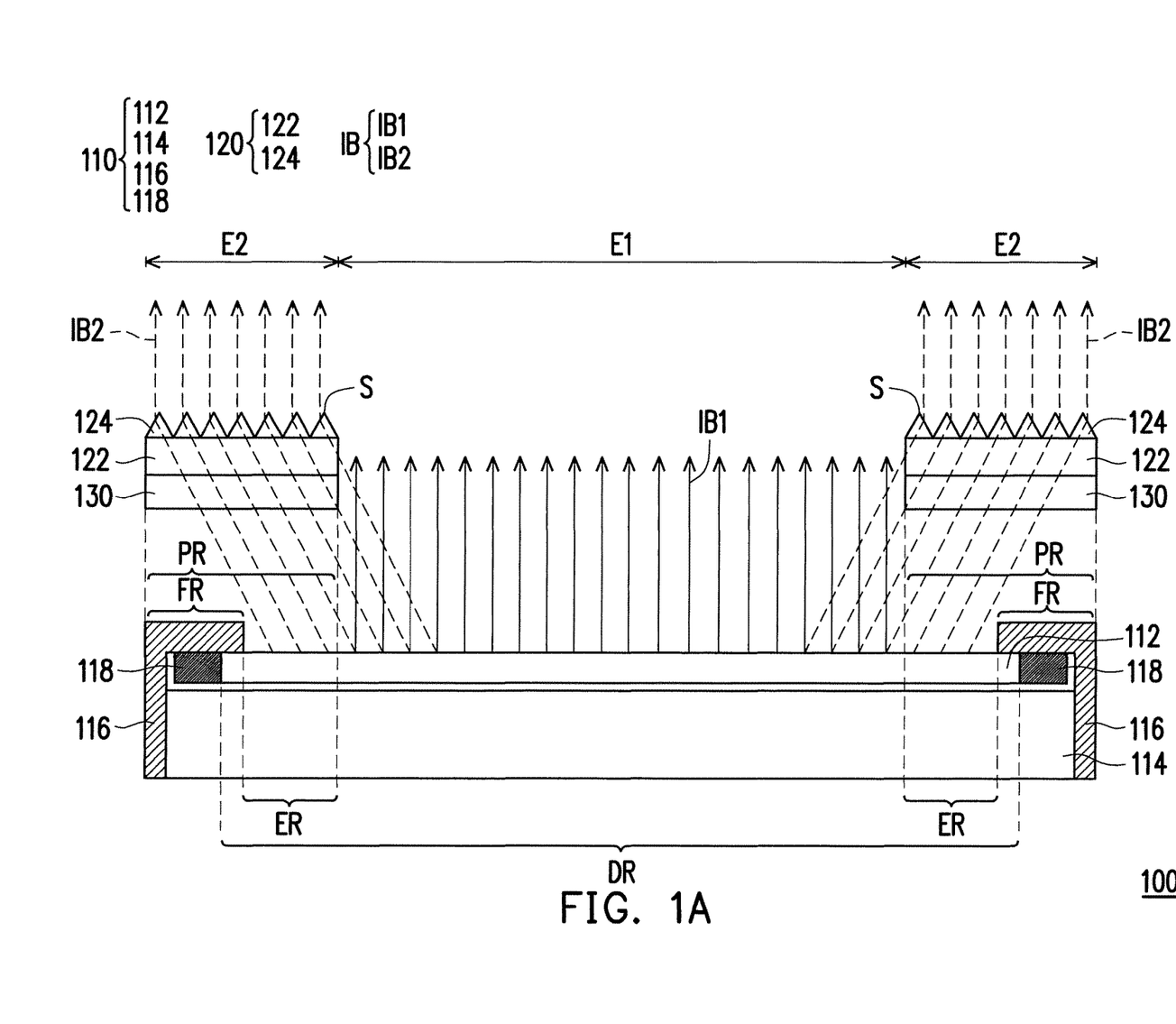
FIG. 1A is a cross-sectional view of a display apparatus according to an embodiment of the invention.
Figure 1B:
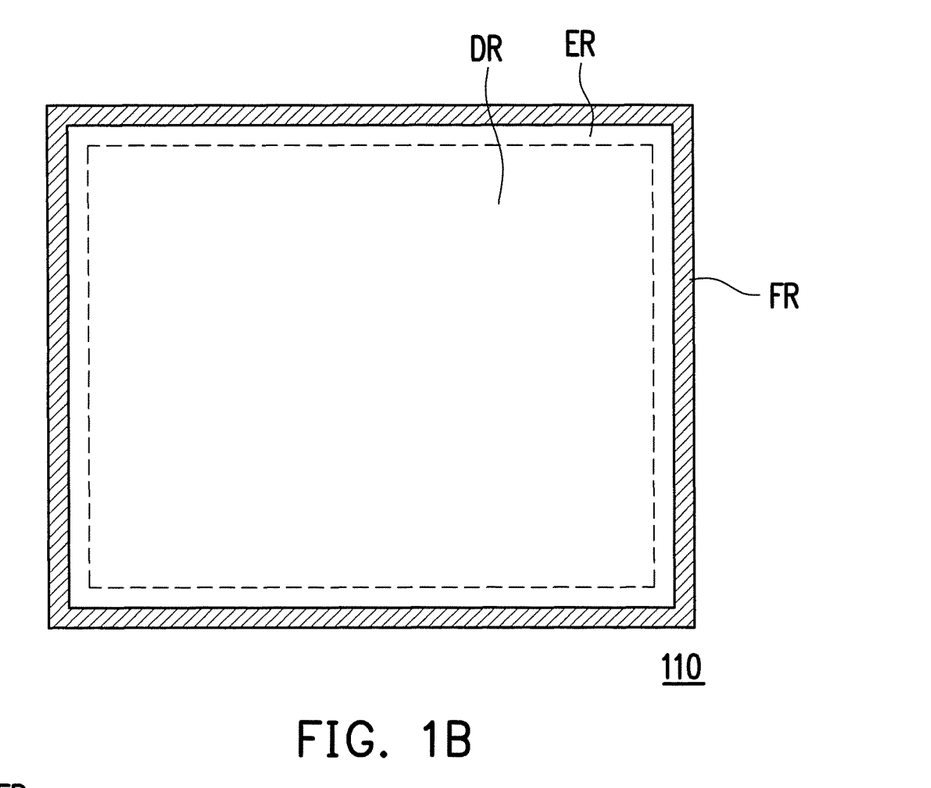
FIG. 1B is a top view of a display in the display apparatus of the embodiment of FIG. 1A.
Figure 1C:
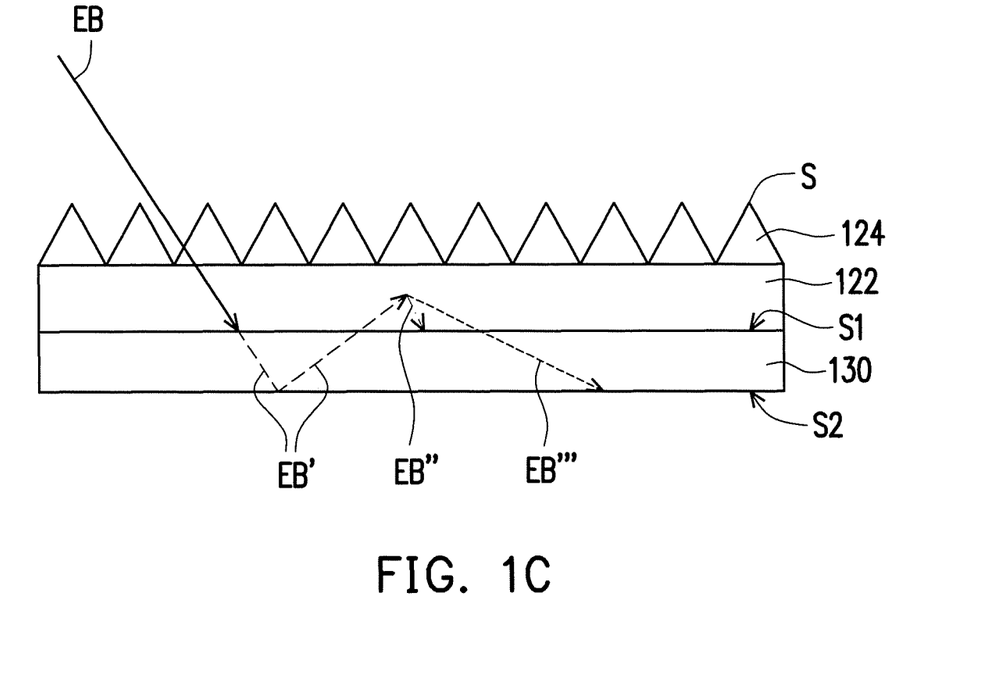
FIG. 1C is a partial enlarged view of a prism module and a filter layer in the display apparatus of the embodiment of FIG. 1A.
Figure 1D:
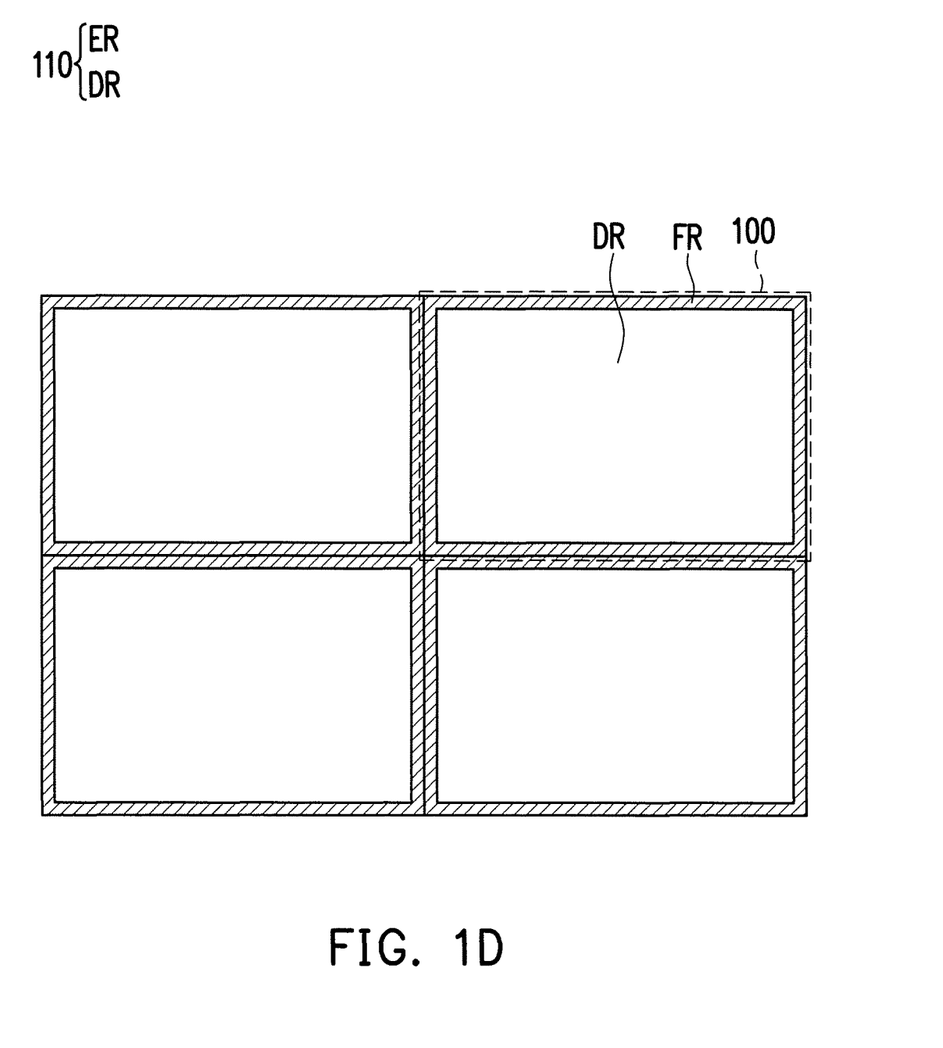
FIG. 1D is a top view of a plurality of the display apparatus of FIG. 1A and FIG. 1B spliced with each other according to an embodiment of the invention.

FIG. 1A is a cross-sectional view of a display apparatus according to an embodiment of the invention. FIG. 1B is a top view of a display in the display apparatus of the embodiment of FIG. 1A. FIG. 1C is a partial enlarged view of a prism module and a filter layer in the display apparatus of the embodiment of FIG. 1A. FIG. 1D is a top view of a plurality of the display apparatus of FIG. 1A and FIG. 1B spliced with each other according to an embodiment of the invention.

Referring to FIG. 1A, in the present embodiment, the display apparatus 100 includes a display 110, a prism module 120 and a filter layer 130. The prism module 120 is disposed on the display 110. The prism module 120 includes a transparent substrate 122 and a plurality of prism structures 124. The prism structures 124 are located on the transparent substrate 122, and the transparent substrate 122 is located between the prism structures 124 and the filter layer 130. The prism structures 124 are, for example, triangular prism structures, and a plurality of tips S of the prism structures 124 are located away from the display 110. The prism structures 124 are, for example, substantially the same. The prism module 120 is, for example, made of a transparent material, and the transparent material is, for example, polymethylmethacrylate (PMMA), polycarbonate (PC), glass or polyethylene terephthalate (PET), though the invention is not limited thereto. The filter layer 130 is disposed between the prism module 120 and the display 110. The filter layer 130 is, for example, bonded to a lower surface of the transparent substrate 122 through a direct bonding manner.

Referring to FIG. 1B, in the present embodiment, a type of the display 110 is, for example, a passive light-emitting display. The display 110 is, for example, a liquid crystal display (LCD). The display 110 includes a LCD panel 112, a backlight module 114, an outer frame 116 and a black matrix 118. The LCD panel 112 is disposed between the filter layer 130 and the backlight module 114. The backlight module 114 is used for providing a light source required by the LCD panel 112 for displaying images, such that the LCD panel 112 may emit an image beam IB. The outer frame 116 is used for fixing the LCD panel 112 and the backlight module 114. In other embodiments, the type of the display 110 may also be a positive light-emitting display. For example, the display 110 may be a light-emitting diode (LED) display, a quantum dots light-emitting diode (QLED) display or an organic light-emitting diode (OLED) display, though the invention is not limited thereto. Since enough instructions and recommendations for the operation and implementation of the display 110 may be learned from ordinary knowledge of the field, detailed description thereof is not repeated.

Referring to FIG. 1A and FIG. 1B, in the present embodiment, the display 110 has a display region DR and a frame region FR surrounding the display region DR. The display region DR has a plurality of display pixels (not shown) to display a display image. A part of traces (not shown) of the display 110, the outer frame 116 and the black matrix 118 are correspondingly disposed in the frame region FR. The frame region FR serves as a non-display region of the display 110. In detail, in the present embodiment, a projection region PR of the prism module 120 on the display 110 is overlapped with the frame region FR and a part of the display region DR located adjacent to the frame region FR (i.e. an edge region ER of the display region DR). The display apparatus 100 has a first light-emitting region E1 and a second light-emitting region E2. The first light-emitting region E1 is located on the display region DR. The second light-emitting region E2 is located on the frame region FR and a part of the display region DR located adjacent to the frame region FR (i.e. the edge region ER of the display region DR). The display 110 is configured to provide the image beam IB. A first portion IB1 (indicated by fine black solid lines) of the image beam IB is emitted out from the first light-emitting region E1 to achieve a display effect of the display region DR. A second portion IB2 (indicated by dot lines) of the image beam IB passes through the prism module 120 and is emitted out from the second light-emitting region E2 in a vertical light-emitting manner, so as to achieve a display effect of the frame region FR. In other words, the frame region FR originally serving as the non-display region may emit the second portion IB2 of the image beam IB out of the second light-emitting region E2 through the prism module 120, such that the frame region FR of the display 110 may also display image. Therefore, the display apparatus 100 of the present embodiment may achieve a borderless display effect by using the prism module 120.

In the present embodiment, the filter layer 130 is, for example, an absorptive polarizing layer 130. The absorptive polarizing layer 130 has an absorption axis (not shown). An axial direction of the absorption axis is perpendicular to a polarization direction of the image beam IB coming from the display 110. The absorptive polarizing layer 130 absorb a part of the beam that is parallel to the absorption axis of the absorptive polarizing layer 130 in the beam, and does not absorb the part of beam that is not parallel to the axial direction of the absorption axis of the absorptive polarizing layer 130. Since the image beam IB of the display 110 has the fixed polarization direction, the absorptive polarizing layer 130 does not absorb the image beam IB coming from the display 110, so that a brightness of the image frame is maintained.

Referring to FIG. 1C, when an environmental beam EB is transmitted to the prism module 120 with a location corresponding to the frame region FR, the environmental beam EB sequentially penetrates through the prism structures 124 and the transparent substrate 122 for reaching the absorptive polarizing layer 130. Since the environmental beam EB does not have a fixed polarization direction, a part of the environmental beam EB with a polarization direction parallel to the absorption axis of the absorptive polarizing layer 130 is absorbed by the absorptive polarizing layer 130, so that the energy of the environmental beam EB is decreased by a half. A part of the environmental beam EB' in the environmental beam EB with the polarization direction perpendicular to the absorption axis of the absorptive polarizing layer 130 passes through an upper surface S1 of the absorptive polarizing layer 130 and is reflected by a lower surface S2 of the absorptive polarizing layer 130. Since the transparent substrate 122 is subjected to a molding stretching process during a manufacturing process thereof, when the environmental beam EB' reflected by the lower surface of the absorptive polarizing layer 130 is incident to the transparent substrate 122 through the upper surface S1 of the absorptive polarizing layer 130, a polarization state of the environmental beam EB' transmitted in the transparent substrate 122 is spoiled by the transparent substrate 122, and the environmental beam EB' further forms an environmental beam EB" with a polarization direction parallel to the absorption axis of the absorptive polarizing layer 130 and an environmental beam EB'" with a polarization direction perpendicular to the absorption axis of the absorptive polarizing layer 130. Similar to the aforementioned description, the environmental beam EB" may be absorbed by the absorptive polarizing layer 130, and the environmental beam EB'" is again reflected by the lower surface S2 of the absorptive polarizing layer 130 to enter the transparent substrate 122, and the polarization state thereof is again spoiled by the transparent substrate 122 to form an environmental beam (not shown) with the polarization direction parallel to the absorption axis of the absorptive polarizing layer 130 and an environmental beam (not shown) with the polarization direction perpendicular to the absorption axis of the absorptive polarizing layer 130. Since an intensity of the environmental beam EB is greatly decreased in the aforementioned process, by configuring the aforementioned filter layer 130 (the absorptive polarizing layer 130) to the display apparatus 100 of the present embodiment, the influence of the environmental beam EB on the prism module 120 is decreased such that the contrast of the image frame presented by the display apparatus 100 is good, and the borderless display effect is achieved. In other words, when the user views the image frame presented by the display apparatus 100 of the present embodiment, since the intensity of the environmental beam EB is greatly decreased, the environmental beam EB is not liable to be reflected to the user's eyes by the prism module 120, and the user is not liable to perceive existence of the prism module 120.

Referring to FIG. 1D, in the present embodiment, four display apparatuses 100 are spliced in a manner of 2×2, so as to achieve an effect of a larger image frame. However, in some embodiments, these display apparatuses 100 may be spliced in other manners, though the invention is not limited thereto.

It should be noted that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 2:
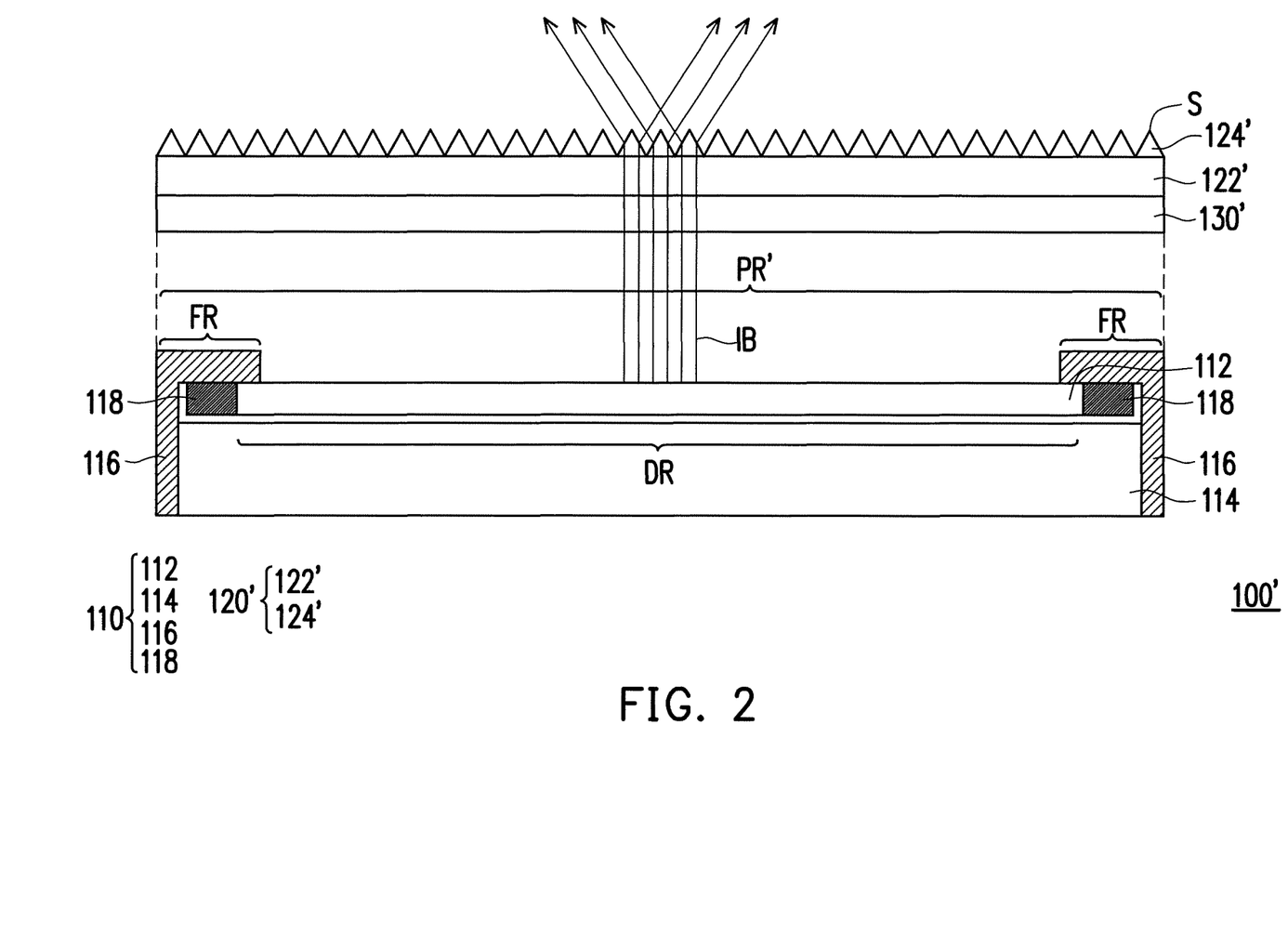
FIG. 2 to FIG. 4 are cross-sectional views of display apparatuses according to different embodiments of the invention.
Figure 3:
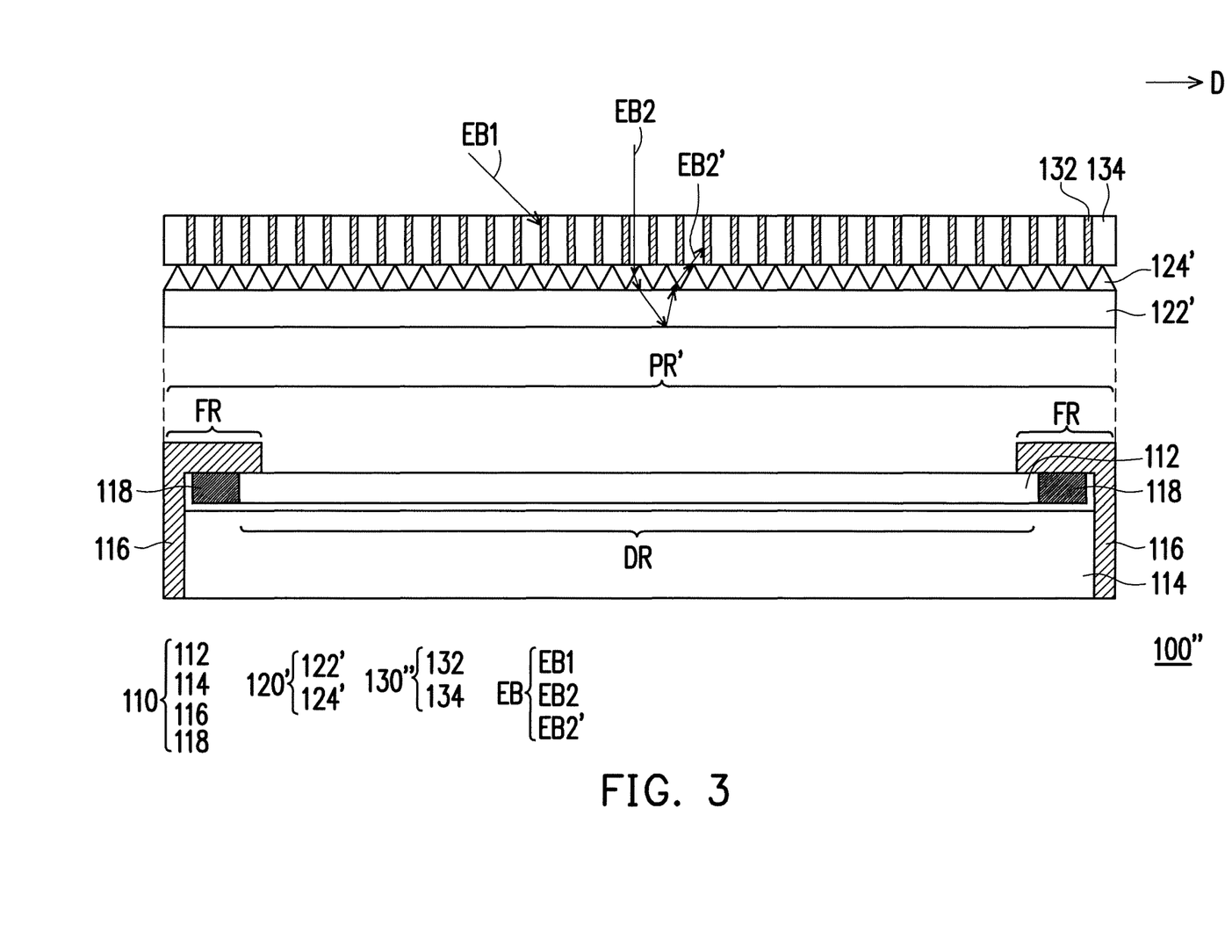
Figure 4:
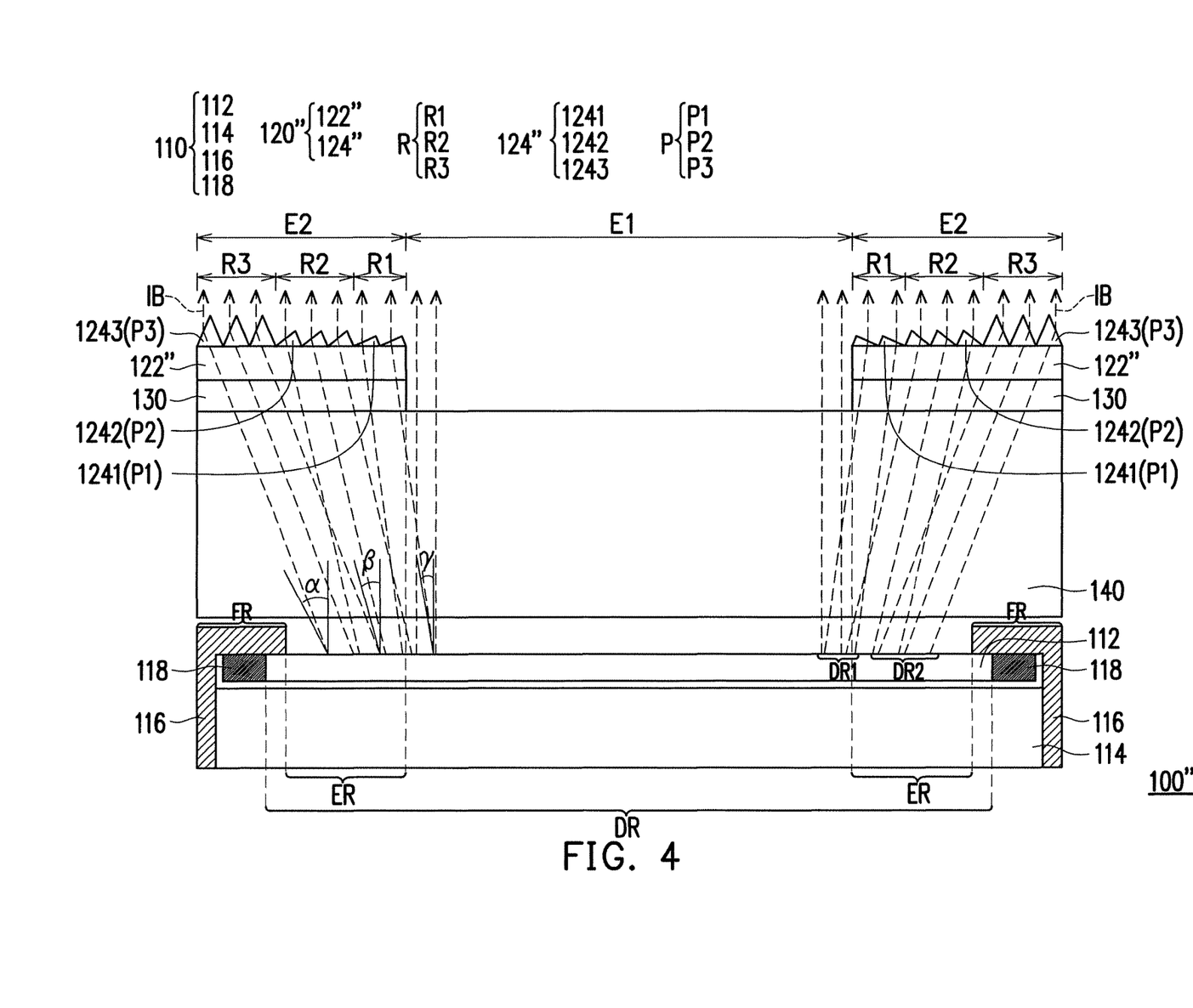
Figure 5A:
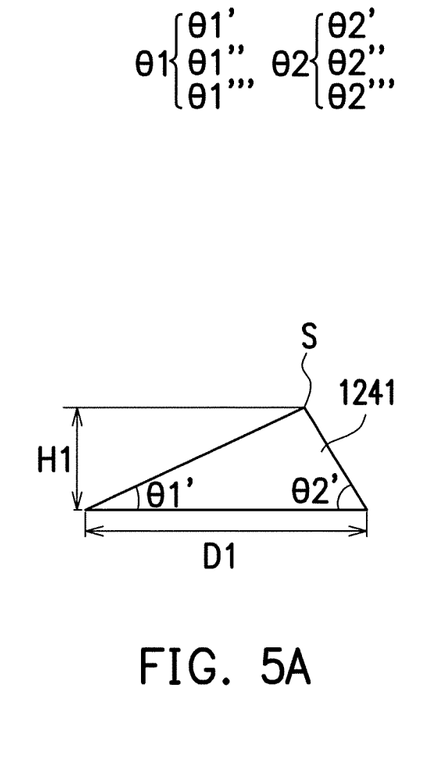
FIG. 5A is an enlarged view of a prism structure located in a first region on the left side of FIG. 4.
Figure 5B:
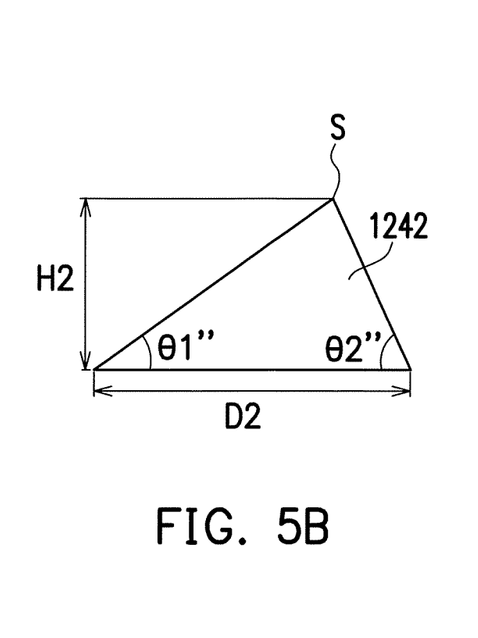
FIG. 5B is an enlarged view of a prism structure located in a second region on the left side of FIG. 4.
Figure 5C:
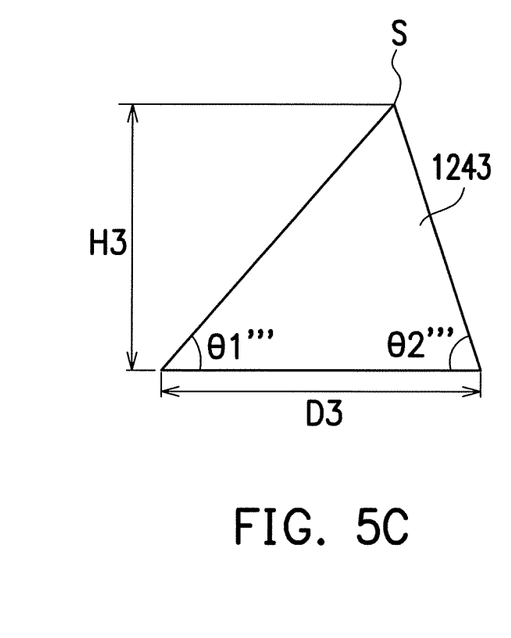
FIG. 5C is an enlarged view of a prism structure located in a third region on the left side of FIG. 4.
Figure 6A:
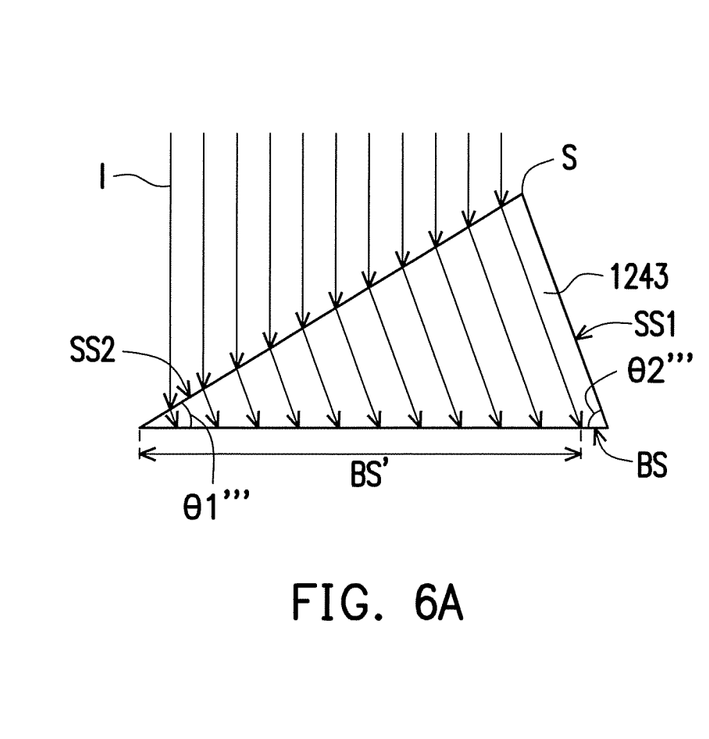
FIG. 6A is a schematic diagram of an effective region area of the prism structure of FIG. 5C.
Figure 6B:
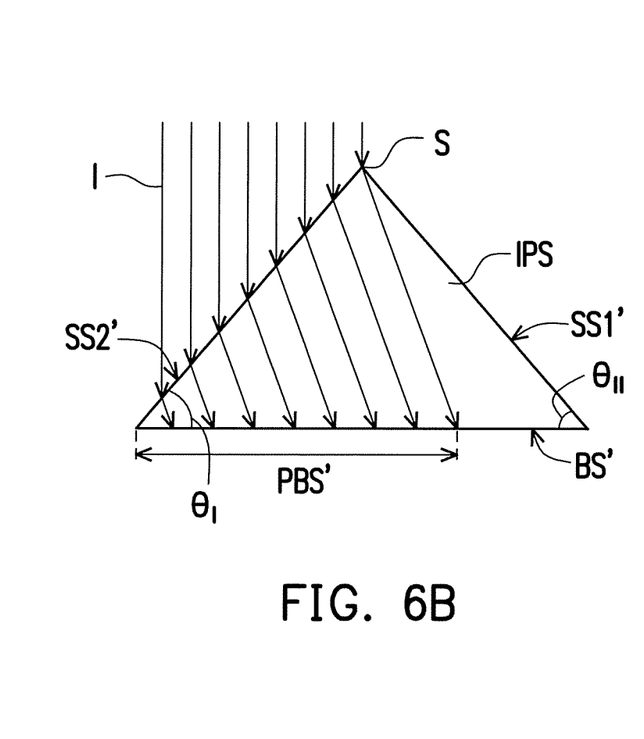
FIG. 6B is a schematic diagram of an effective region area of an isosceles triangular prism structure.
Figure 7:
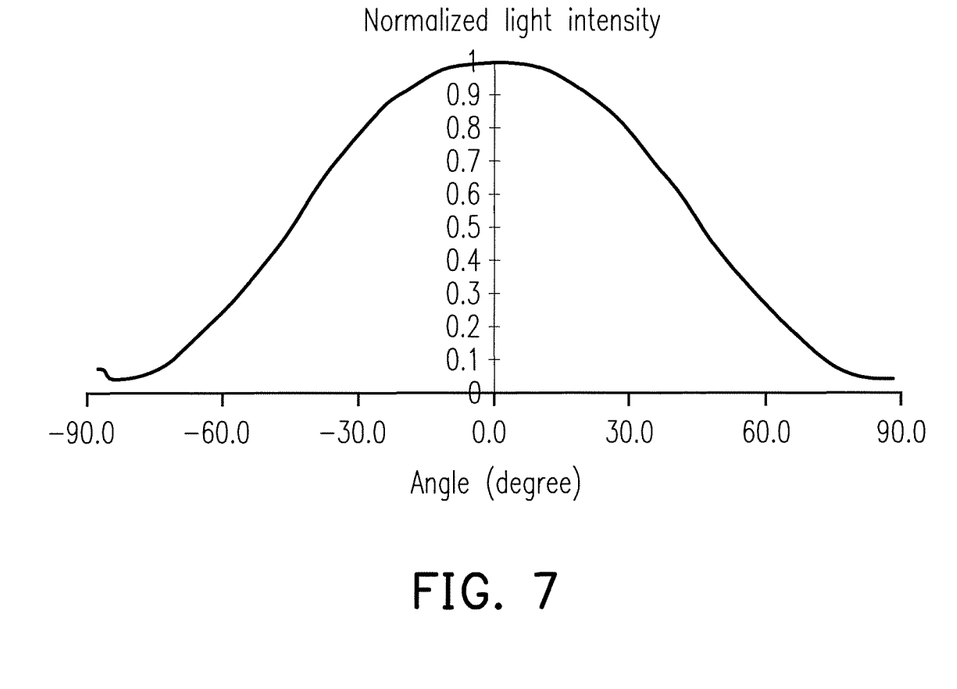
FIG. 7 is a relationship diagram of light-emitting angles and brightness of a display of FIG. 4.

FIG. 2 to FIG. 4 are cross-sectional views of display apparatuses according to different embodiments of the invention. FIG. 5A is an enlarged view of a prism structure located in a first region on the left side of FIG. 4. FIG. 5B is an enlarged view of a prism structure located in a second region on the left side of FIG. 4. FIG. 5C is an enlarged view of a prism structure located in a third region on the left side of FIG. 4. FIG. 6A is a schematic diagram of an effective region area of the prism structure of FIG. 5C. FIG. 6B is a schematic diagram of an effective region area of an isosceles triangular prism structure. FIG. 7 is a relationship diagram of light-emitting angles and brightness of a display of FIG. 4.

Referring to FIG. 2, the display apparatus 100' of the present embodiment is similar to the display apparatus 100 of FIG. 1A and FIG. 1B, and a main difference there between is that the projection region PR' of the prism module 120' on the display 110 is completely overlapped with the frame region FR and the display region DR. Based on the above configuration, in the display apparatus 100' of the present embodiment, the image beam IB coming from the display 110 may be transmitted to different directions by the prism module 120', so that the image frame of the display apparatus 100' may be shared to users of different locations. Moreover, due to configuration of the filter layer 130', the image frame of the display apparatus 100' of the present embodiment is not liable to be influenced by the external environmental beam, so that a good contrast is achieved.

Referring to FIG. 3, the display apparatus 100" of the present embodiment is similar to the display apparatus 100' of FIG. 2, and a main difference there between is that the prism module 120' is disposed between the filter layer 130" and the display 110. Moreover, the filter layer 130" includes a plurality of light-shielding portions 132 and a plurality of transparent portions 134. The light-shielding portions 132 and the transparent portions 134 are arranged in alternation along an arrangement direction D of the prism structures 124. A material of the light-shielding portion 132 is, for example, a light absorbing material, and the light absorbing material is, for example, black ink or black resin, etc., and a material of the transparent portion 134 is, for example, a transparent material or air, though the invention is not limited thereto. When the environmental beam EB is transmitted to the prism module 120', an environmental beam EB1 with a larger incident angle (only one ray of environmental beam EB1 is illustrated) is shielded or absorbed by the light-shielding portions 132, and may not be reflected back to the user's eyes by the prism module 120". An environmental beam EB2 with a smaller incident angle (only one ray of environmental beam EB2 is illustrated) may penetrate through the transparent portions 134 and is transmitted to the prism module 120'. The environmental beam EB2 is then refracted by the prism structures 124' and transmitted to the lower surface of the transparent substrate 122'. The environmental beam EB2 is reflected by the lower surface of the transparent substrate 122' and is again incident to the prism structures 124', and the environmental beam EB2 is then refracted by the prism structures 124' to form an environmental beam EB2' with a larger incident angle. The environmental beam EB2' is then shielded or absorbed by the light-shielding portions 132 in the filter layer 130". Therefore, due to the configuration of the aforementioned filter layer 130", the display apparatus 100" of the present embodiment may reduce the influence of the environmental beam EB on the prism module 120', and the image frame presented by the display apparatus 100" may have a good contrast. Moreover, in other embodiments, the filter layer 130" of the embodiment of FIG. 3 may also be applied to the embodiment of FIG. 1A, where the filter layer 130" is adopted to replace the filter layer 130 (the absorptive polarizing layer), the prism module 120 is disposed between the filter layer 130" and the display 110, and the projection region of the filter layer 130" on the display 110 is overlapped with the projection region PR of the prism module 120 on the display 110, so as to achieve the aforementioned effect. Alternatively, the filter layer 130" may also be applied to the embodiment of FIG. 4, and the effect thereof is similar to the aforementioned description, and detail thereof is not repeated.

Referring to FIG. 4, the display apparatus 100''' of the present embodiment is similar to the display apparatus 100 of FIG. 1A and FIG. 1B, and a main difference there between is that the display apparatus 100''' of the present embodiment further includes a transparent plate 140. The transparent plate 140 is disposed between the prism module 120" and the display 110. The transparent plate 140 spaces the prism module 120" and the display 110, and is used for carrying the prism module 120", though the invention is not limited thereto. In the present embodiment, the prism module 120" has a plurality of regions R, for example, three regions R1, R2 and R3, though the invention is not limited thereto. The first region R1 is the closest to the display region DR. The second region R2 is secondarily closest to the display region DR. The third region R3 is the farthest from the display region DR. The prism structures 124" in the prism module 120 are divided into a plurality of portions P, for example, three portions P1, P2 and P3, though the invention is not limited thereto. A portion P of the prism structures 124" is correspondingly located in a region R. In detail, the first portion P1 (for example, two prism structures 1241) of the prism structures 124" is correspondingly located in the first region R1. The second portion P2 (for example, three prism structures 1242) of the prism structures 124" is correspondingly located in the second region R2. The third portion P3 (for example, three prism structures 1243) of the prism structures 124" is correspondingly located in the third region R3. Referring to FIG. 5A to FIG. 5C, in the present embodiment, each of the prism structure 124" has a first base angle θ1 and a second base angle θ2. In each of the prism structure 124", a position of the first base angle θ1 is relatively close to the frame region FR compared to a position of the second base angle θ2. Magnitudes of the first base angles θ1 in the regions R (R1, R2 and R3) are gradually increased along a direction from the display region DR to the frame region FR. Referring to FIG. 5A to FIG. 5C, in detail, the first base angles θ1' of the prism structures 1241 are smaller than the first base angles θ1" of the prism structures 1242, and the first base angles θ1" of the prism structures 1242 are smaller than the first base angles θ1' of the prism structures 1243. In each of the regions R, the first base angles θ1 of the portion P of the prism structures 124" are the same, and the second base angles θ2 of the portion P of the prism structures 124" are the same. Referring to FIG. 4, to be specific, in the first region R1, the first base angles θ1' of the first portion P1 of the prism structures 124" are the same, and the second base angles θ2' of the first portion P1 of the prism structures 124" are the same. In the second region R2, the first base angles θ1" of the second portion P2 of the prism structures 124" are the same, and the second base angles θ2" of the second portion P2 of the prism structures 124" are the same. In the third region R3, the first base angles θ1''' of the third portion P3 of the prism structures 124" are the same, and the second base angles θ2''' of the third portion P3 of the prism structures 124" are the same. The filter layer 130 is disposed between the transparent plate 140 and the prism module 120", and the filter layer 130 may greatly decrease the influence of the environmental beam EB on the prism module 120", and the effect thereof is similar to the aforementioned description, so that detail thereof is not repeated.

Referring to FIG. 4 and FIG. 5A, in the present embodiment, the first base angle θ1' of the prism structure 1241 in the first region R1 is, for example, 10 degrees, the second base angle θ2' is, for example, 72 degrees, a height H1 between a tip S and a bottom surface of the prism structure 1241 is, for example, 6 μm, and a width D1 of the bottom surface of the prism structure 1241 is, for example, 36 μm, though the invention is not limited thereto. Referring to FIG. 4 and FIG. 5B, in the present embodiment, the first base angle θ1" of the prism structure 1242 in the second region R2 is, for example, 22 degrees, the second base angle θ2" is, for example, 72 degrees, a height H2 between a tip S and a bottom surface of the prism structure 1242 is, for example, 13 μm, and a width D2 of the bottom surface of the prism structure 1242 is, for example, 36 μm, though the invention is not limited thereto. Referring to FIG. 4 and FIG. 5C, in the present embodiment, the first base angle θ1''' of the prism structure 1243 in the third region R3 is, for example, 45 degrees, the second base angle θ2''' is, for example, 72 degrees, a height H3 between a tip S and a bottom surface of the prism structure 1243 is, for example, 27 μm, and a width D3 of the bottom surface of the prism structure 1243 is, for example, 36 μm, though the invention is not limited thereto.

Referring to FIG. 4, in the present embodiment, a part of the image beam IB emitted by a partial region DR1 of the display region DR may be emitted out from the first light-emitting region E1 and emitted out from the second light-emitting region E2 through the prism structures 1241 located in the first region R1. In other words, the image presented by the partial region DR1 may be directly emitted out from the first light-emitting region R1 or duplicated by the prism structures 1241 to emit out from the second light-emitting region E2. A part of the image beam IB emitted by a partial region DR2 of the display region DR may be emitted out from the second light-emitting region E2 through both of the prism structures 1242 located in the second region R2 and the prism structures 1243 located in the third region R3. In other words, the image presented by the partial region DR2 may be duplicated by the prism structures 1242 and 1243 to emit out from two places of the second light-emitting region E2. In the display apparatus 100''' of the present embodiment, the prism structures 124" in the prism module 120" are designed to have a plurality of different first base angles θ1, and the magnitudes of the first base angles θ1 are gradually increased along the direction from the display region DR to the frame region FR. Within the area of the frame region FR, the image beam IB is refracted by the prism structures 124" with different first base angles θ1 to form a plurality of sections of image frames, such that the user is not liable to perceive obvious misalignment of the image frames, and visual discomfort of the user is mitigated.

Referring to FIG. 4 to FIG. 7, in the present embodiment, a brightness of the image frame corresponding to the second light-emitting region E2 is proportional to a product of a ratio of the image beam IB entering the prism structures 124" of each of the regions R and a light-emitting brightness ratio of the maximum value of the light-emitting angles of the corresponding prism structures 124" relative to the light emitting angle of 0. In the following description, the meaning of the ratio of the image beam IB entering the prism structures 124" and the light-emitting brightness ratio of the maximum value of the light-emitting angles of the corresponding prism structures 124" relative to the light emitting angle of 0 is described in detail.

In detail, the ratio of the image beam IB entering the prism structures 124" is related to the first base angles θ1 and the second base angles θ2 in the prism structures 124". The ratio of the image beam IB entering the prism structures 124" is, for example, an effective region area ratio of the prism structures 124". The effective region area ratio is described below with reference of FIG. 6A and FIG. 6B. Referring to FIG. 6A, FIG. 6A is a schematic diagram of an effective region area of the prism structure of FIG. 5C. The prism structure 1243 has a bottom surface BS, a first side surface SS1 and a second side surface SS2. The bottom surface BS corresponds to a vertex of the prism structure 1243. The first side surface SS1 corresponds to the first base angle θ1''' of the prism structure 1243. The second side surface SS2 corresponds to the second base angle θ2''' of the prism structure 1243. In FIG. 6A, an area of the second side surface SS2 is greater than an area of the first side surface SS1. Since the second base angle θ''' is relatively close to the display region DR compared to the first base angle θ''', after a forward beam I entering the prism structure 1243 through the second side surface SS2 is refracted by the prism structure 1243, the forward beam I is emitted out from a part of the bottom surface BS' and transmitted towards a direction of the display region DR. Comparatively, a light beam (not shown) entering the prism structure 1243 through the first side surface SS1 is refracted by the prism structure 1243 and transmitted towards a direction of the frame region FR. Based on optical reversibility, the image beam IB coming from the display region DR may enter the prism structure 1243 through a part of the bottom surface BS', and is forwardly emitted out through the second side surface SS2. Comparatively, since a light intensity of the light beam coming from the frame region FR is far less than a light intensity of the image beam IB, the light beam emitted out from the first side surface SS1 may be neglected. The effective region area ratio is defined as a ratio between an area of a part of the bottom surface of the prism structure 124" receiving the image beam IB and a total area of the bottom surface of the prism structure 124". Taking FIG. 6A as an example, the effective region area ratio is equal to a ratio between an area of a part of the bottom surface BS' and an area of the bottom surface BS. Through calculation, an effective region area ratio of the prism structure 1243 of FIG. 5C (or FIG. 6A) is 99%, an effective region area ratio of the prism structure 1242 of FIG. 5B is 93%, and an effective region area ratio of the prism structure 1241 of FIG. 5A is 95%, and the effective region area ratio may be properly adjusted by those skilled in the art according to an actual design requirement, though the invention is not limited thereto.

Referring to FIG. 6B, FIG. 6B illustrates an isosceles triangular prism structure IPS. In FIG. 6B, an area of the second side surface SS2' is equal to an area of the first side surface SS1'. Since the second base angle $\theta_{II}$ (for example, 45 degrees) is relatively close to the display region DR compared to the first base angle $\theta_I$ (for example, 45 degrees), the forward beam I entering the isosceles triangular prism structure IPS through the second side surface SS2' is refracted by the isosceles triangular prism structure IPS and emitted out from a part of the bottom surface PBS' for transmitting towards a direction of the display region DR. Comparatively, the light beam (not shown) entering the isosceles triangular prism structure IPS through the first side surface SS1' is refracted by the isosceles triangular prism structure IPS and transmitted towards a direction of the frame region FR. Based on optical reversibility, the image beam IB coming from the display region DR may enter the isosceles triangular prism structure IPS through a part of the bottom surface PBS', and is forwardly emitted out through the second side surface SS2'. Comparatively, since a light intensity of the light beam coming from the frame region FR is far less than a light intensity of the image beam IB, the light beam emitted out from the first side surface SS1' may be neglected. An effective region area ratio of the isosceles triangular prism structure IPS of FIG. 6B is equal to a ratio between an area of a part of the bottom surface PBS' and an area of the bottom surface BS'. Through calculation, the effective region area ratio of FIG. 6B is, for example, 66%. Since the prism structures 124" (FIG. 5A-FIG. 5C) of the present embodiment are asymmetric prism structures 124", compared to the symmetric isosceles triangular prism structure IPS (FIG. 6B), the prism structures 124" of the present embodiment have higher effective region area ratios.

Then, referring to FIG. 4 and FIG. 7, in the present embodiment, the light-emitting angle of the display region DR is defined as an angle suitable for guiding a part of the image beam IB to the forward beam through the corresponding portion P of the prism structures 124". Referring to FIG. 4, a light emitting angle of the partial region of the display region DR corresponding to the first portion P1 (the prim structure 1241) of the prism structures 124" is γ, and γ is, for example, 5.4 degrees, and according to FIG. 7, it is known that a light-emitting brightness ratio between a light-emitting brightness measured when γ is 5.4 degrees and a light-emitting brightness measured when the angle is 0 degree (i.e. the forward beam) is 97%. A light emitting angle of the partial region of the display region DR corresponding to the second portion P2 (the prim structure 1242) of the prism structures 124" is β, and β is, for example, 17 degrees, and according to FIG. 7, it is known that a light-emitting brightness ratio between a light-emitting brightness measured when β is 17 degrees and a light-emitting brightness measured when the angle is 0 degree (i.e. the forward beam) is 90%. A light emitting angle of the partial region of the display region DR corresponding to the third portion P3 (the prim structure 1243) of the prism structures 124" is α, and α is, for example, 28 degrees, and according to FIG. 7, it is known that a light-emitting brightness ratio between a light-emitting brightness measured when α is 28 degrees and a light-emitting brightness measured when the angle is 0 degree (i.e. the forward beam) is 80%. Therefore, it is known that the brightness of the image frame of the second light emitting region E2 corresponding to each of the regions R is a product of a ratio of the image beam IB entering the prism structures 124″ of each of the regions R and a light-emitting brightness ratio of the maximum value of the light-emitting angles of the corresponding prism structures 124″ relative to the light-emitting angle of 0. A following table one is a table of the aforementioned parameters, and the following parameters may be properly adjusted by those skilled in the art according to an actual requirement, though the invention is not limited thereto.

TABLE ONE

|  | Prism structure 1241 | Prism structure 1242 | Prism structure 1243 |
|---|---|---|---|
| Location | The first region R1 of the prism structure 124‴ that is the closest to the display region DR | The second region R2 of the prism structure 124‴ that is the secondarily closest to the display region DR | The third region R3 of the prism structure 124‴ that is the farthest from the display region DR |
| First base angle θ1 | 10 degrees | 22 degrees | 45 degrees |
| Second base angle θ2 | 72 degrees | 72 degrees | 72 degrees |
| Effective region area ratio | 95% | 93% | 99% |
| Light-emitting angle of the corresponding prism structure of different regions of the display region DR | 5.4 degrees (γ) | 17 degrees (β) | 28 degrees (α) |
| Light-emitting brightness ratio of the maximum value of the light-emitting angles relative to the light-emitting angle of 0 | 97% | 90% | 80% |
| Simulation brightness | 91.2% | 83.7% | 79% |

Based on the aforementioned configuration, in the display apparatus 100‴ of the present embodiment, the brightness of the image frame corresponding to the first region R1 located the closest to the display region DR is greater than the brightness of the image frame corresponding to the second region R2 located secondarily closest to the display region DR, and the brightness of the image frame corresponding to the second region R2 located secondarily closest to the display region DR is greater than the brightness of the image frame corresponding to the third region R3 located the farthest from the display region DR. In other words, based on the aforementioned configuration, the brightness of the image frame corresponding to the location of the prism module 120″ is gradually decreased along the direction from the display region DR to the frame region FR rather than a drastic decrease of the brightness in the prior art, such that visual discomfort of the user is mitigated.

In summary, the display apparatus of the invention has at least one of the following advantages: through the configuration of the filter layer, the display apparatus may decrease the influence of the environmental beam on the prism module, such that besides the display apparatus may achieve the borderless display effect, the display apparatus may also present image frames with good contrast.

Moreover, in the display apparatus of the invention, by completely overlapping the projection region of the prism module with the display region and the frame region of the display, the prism module may transmit the image beam to different directions, so that the image frame of the display apparatus may be shared to users in different locations.

Moreover, in the display apparatus of the invention, the prism structures in the prism module are designed to have a plurality of different first base angles, and the magnitudes of the base angles are gradually increased along the direction from the display region to the frame region. The image beam passing through the prism structures with different first base angles may be refracted to form a plurality of sections of image frames, such that the user is not liable to perceive obvious misalignment of the image frames. Moreover, through the aforementioned configuration, the brightness of the image frame corresponding to the location of the prism module is gradually decreased along the direction from the display region to the frame region rather than a drastic decrease of the brightness in the prior art, such that visual discomfort of the user is mitigated.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
a display;
a prism module, disposed on the display, and comprising a transparent substrate and a plurality of prism structures, wherein the plurality of prism structures are located on the transparent substrate, and a plurality of tips of the prism structures are located away from the display; and
a filter layer, disposed between the prism module and the display, wherein the filter layer is an absorptive polarizing layer, and an axial direction of an absorption axis of the absorptive polarizing layer is perpendicular to a polarization direction of an image beam coming from the display,
wherein the display has a display region and a frame region surrounding the display region,
wherein a projection region of the prism module on the display is overlapped with the frame region and a part of the display region located adjacent to the frame region, and at least a portion of the prism module is disposed on a top of the frame region.

2. The display apparatus as claimed in claim 1, wherein the prism module has a plurality of regions, the plurality of prism structures are divided into a plurality of portions, one portion of the plurality of prism structures is correspondingly located in one of the plurality of regions, each of the plurality of prism structures has a first base angle and a second base angle, and a position of the first base angle is relatively close to the frame region compared to a position of the second base angle, wherein magnitudes of the first base angles in the plurality of regions are gradually increased along a direction from the display region to the frame region.

3. The display apparatus as claimed in claim 1, wherein the projection region of the prism module on the display is completely overlapped with the frame region and the display region.

4. The display apparatus as claimed in claim 1, wherein the display apparatus has a first light-emitting region and a second light-emitting region, the first light-emitting region is located on the display region, the second light-emitting region is located on the frame region and a part of the display region located adjacent to the frame region, the display is configured to provide an image beam, a first portion of the image beam is emitted out from the first light-emitting region, and a second portion of the image beam passes through the prism module and is emitted out from the second light-emitting region.

5. A display apparatus, comprising:
a display, having a display region and a frame region surrounding the display region;
a prism module, disposed on the display, and comprising a transparent substrate and a plurality of prism structures, wherein the plurality of prism structures are located on the transparent substrate, and a plurality of tips of the prism structures are located away from the display, and a projection region of the prism module on the display is overlapped with the frame region and a part of the display region located adjacent to the frame region, the prism module has a plurality of regions, the plurality of prism structures are divided into a plurality of portions, one portion of the plurality of prism structures is correspondingly located in one of the plurality of regions, each of the plurality of prism structures has a first base angle and a second base angle, and a position of the first base angle is relatively close to the frame region compared to a position of the second base angle, wherein magnitudes of the first base angles in the plurality of regions are gradually increased along a direction from the display region to the frame region; and
a filter layer, disposed between the prism module and the display, or the prism module being disposed between the filter layer and the display, wherein in each of the plurality of regions, the first base angles of the portion of the plurality of prism structures are the same, and the second base angles of the portion of the plurality of prism structures are the same.

* * * * *